United States Patent Office 2,913,000
Patented Nov. 17, 1959

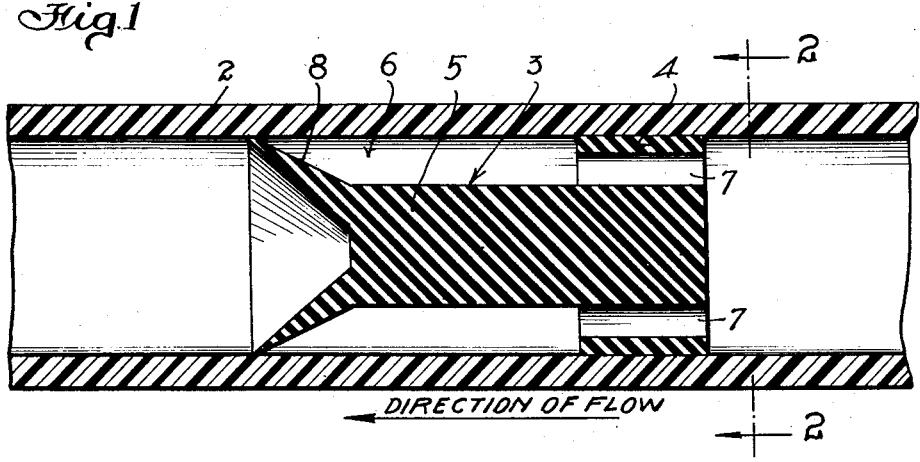
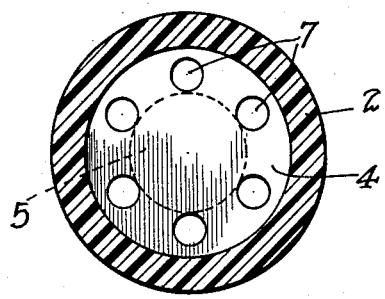
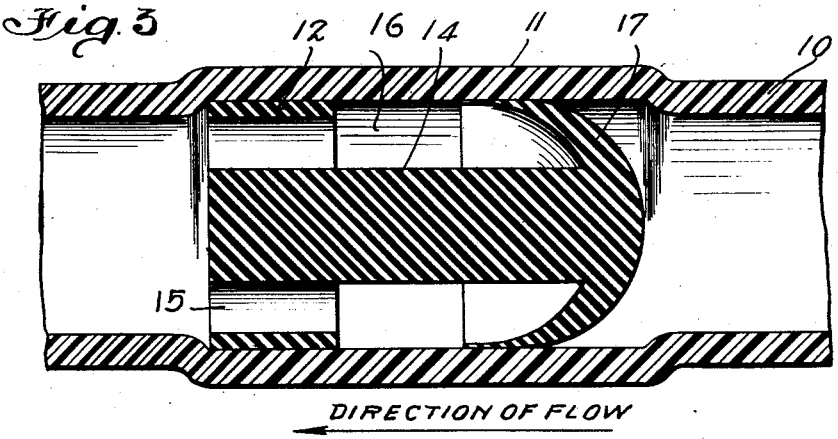

2,913,000

FLOW CONTROL VALVE

Martin Roberts, Los Angeles, Calif., assignor to Don Baxter, Inc., Glendale, Calif., a corporation of Nevada Application June 23, 1954, Serial No. 438,834

1 Claim. (Cl. 137—525)

This invention relates to a check valve, that is a valve designed to allow liquids or gases to flow through a tube in one direction only.

The check valve of the present invention is useful in different hydraulic systems, controls and dispensing pumps. It is useful in connection with blood donor sets to prevent backflow of air or blood to the donor. It is also useful in connection with plastic container administration sets to prevent loss of blood if the patient rolls off the container while body weight is being used to administer solutions, and it is useful in association with various air inlets to fluid systems to prevent liquid leaking out of the inlets. It is also useful to prevent backflow of gases in control systems, interconnected supply systems, and inflatable articles, such for example as sealing the stems of beach balls, rubber bladders, etc. For example, it is useful in connection with lawn sprinklers to prevent mud entering water lines. It may also be valuable as a surgical replacement for defective heart valves where plastic ball and seat check valves have heretofore been used.

Various types of check valves have heretofore been designed for controlling the direction of flow of fluids. These all, however, have their disadvantages. The ball and seat check valves are costly, tend to leak under low back pressure and wear in use. The so-called Bunsen-type valve which consists of a flattened section of collapsible tubing, fixed inside the fluid passageway, has been designed to close under back pressure by the tube flattening. This type of valve leaks under low back pressure and the pressure required to open and close the valve cannot be regulated by the design.

By means of the present invention a check valve is provided which is low in cost. The check valve of the present invention does not tend to leak under low back pressure. Wear of the elements or parts of the check valve of the present invention does not seriously affect its performance. Even inaccurate or somewhat defectively constructed valves of the present invention can be opened by sufficient pressure and closed by back pressure. The check valve of the present invention is readily constructed of material which will not react with fluid handled or contaminate the fluid. It is independent of gravity and operates equally well in any position.

Essentially the check valve of the present invention consists of a tubing insert which may be composed of one piece produced from a flexible material, such as rubber or other flexible plastic substances, such as vinyl, polyethylene, etc. The valving action of the check valve of the present invention occurs on the outside of the fluid flow area rather than in the center. The check valve of the present invention, together with further objects and advantages of the invention will be more fully understood from the following description of the preferred form of the invention, the description being given in connection with the accompanying drawing, in which Figure 1 is an elevation in vertical section of one form of the invention;

Figure 2 is a section on the line 2—2 of Figure 1;

Figure 3 is an elevation mainly in vertical section of a modified form of the invention.

Referring first to Figures 1 and 2 of the drawing, I have shown a form of the invention as it is used merely as an insert in a tubing. In the drawing, 2 indicates a glass or plastic tubing, and 3 generally indicates the insert. The insert comprises the supporting portion 4, which may be in the form of a cylindrical body having a pressed fit within a wall of the glass tubing 2. From the supporting portion 4 there is a stem portion 5 which likewise may be of cylindrical form, or any other desired shape but having a reduced diameter so as to provide the annular space 6 for the passage of fluid. Suitable channels or passages 7 are provided around or through the supporting portion 4 to allow the fluid to flow from the right of the insert 3 into this annular fluid passage 6. At the end of the stem portion 5 there is provided a flexible valve portion 8 which extends angularly from the stem to contact the inner walls of the tube 2 at an angle so that the flow of fluid in one direction will tend to contract the valve portion 8 away from the glass walls, while a backflow in the other direction will tend to expand the same or to increase the pressure of the same against the inner walls of the tubing 2. In the form of the invention shown in Figures 1 and 2, the valve portion 8 is in the form of a flexible cone and is intended to permit the flow of fluid to the left as viewed in the figures, whereas, back pressure of fluid in the opposite direction will tend to expand the valve member into increased sealing contact with the tubing walls.

Now referring to Figure 3 of the drawing, I have shown a modification of the invention. In this form of the invention there is built into the tubing 10, a housing 11 for the insert larger than the remainder of the tubing 10 in order that the insert may not restrict the flow of fluid through the tubing. I have also designed the valve so as to open by the flow of fluid to the flexible closing element rather than away from the same as in the first form of the invention. In this form of the invention, 12 indicates the supporting portion of the body which is press-fitted within the housing, 14 indicates the stem of reduced diameter, 15 the channels or openings through the supporting portion 12 into the annular passage 16. The valve portion 17 of the device is generally conical or cupshaped but angled backward toward the supporting portion 12, so that as viewed in the figure it permits the flow of fluid from right to left but seals against back flow of fluid from left to right.

The pressure necessary to operate any of the check valves of the present invention may be readily regulated in the design of the check valve. Such regulation can be effected, for example, by varying the stiffness of the material used for the valve portions 8 or 17, or by changing the angle at which the valve portions 8 or 17 contact the wall of the tubing, or by regulating the length of the valve portion from the base portions of the insert.

While in the examples of the invention shown the tubing is indicated as having circular cross-sections this is not necessary to the invention.

Each of the foregoing valves herein illustrated are well adapted to accomplish the objects of the present invention and this invention is of the scope set forth in the appended claim.

I claim:

A one piece flexible control valve to be positioned within a tube or pipe comprising a flexible stem, a support member secured to said stem at one end thereof engaging the inner surface of said tube, said support member having at least one fluid passageway therethrough and having a diameter substantially greater than the diameter of the said stem whereby fluid is permitted to pass between the outer surface of said stem and the inner surface of said tube, a flexible sealing means provided at the opposite end of said stem from said support member, and said flexible sealing means decreasing in thickness from the stem to the inner surface of said tube and meeting said surface of said tube at an angle from the normal.

References Cited in the file of this patent

UNITED STATES PATENTS

| | | |
|---|---|---|
| 155,668 | Painter | Oct. 6, 1875 |
| 549,678 | Miller | Nov. 12, 1895 |
| 2,329,960 | Vehreul | Sept. 21, 1943 |
| 2,332,787 | Fleming | Oct. 26, 1943 |
| 2,333,036 | Orndorff | Oct. 26, 1943 |
| 2,576,192 | Poznik | Nov. 27, 1951 |
| 2,605,784 | Snider | Aug. 5, 1952 |
| 2,674,064 | Gassaway | Apr. 6, 1954 |
| 2,777,464 | Mosely | Jan. 15, 1957 |